United States Patent
Godkin

(10) Patent No.: US 7,250,754 B2
(45) Date of Patent: Jul. 31, 2007

(54) POSITION SENSOR UTILIZING A LINEAR HALL-EFFECT SENSOR

(75) Inventor: Mikhail Godkin, San Diego, CA (US)

(73) Assignee: Bei Sensors and Systems Company, Inc., Sylmer, CA (US)

( * ) Notice: Subject to any disclaimer, the term of this patent is extended or adjusted under 35 U.S.C. 154(b) by 0 days.

(21) Appl. No.: 11/656,173

(22) Filed: Jan. 19, 2007

(65) Prior Publication Data

US 2007/0114990 A1    May 24, 2007

Related U.S. Application Data

(63) Continuation of application No. 10/778,879, filed on Feb. 13, 2004, now Pat. No. 7,166,996.

(51) Int. Cl.
*G01B 7/14* (2006.01)
*G01R 33/07* (2006.01)
*H01L 43/06* (2006.01)

(52) U.S. Cl. ............................... 324/207.24; 324/207.2

(58) Field of Classification Search ........... 324/207.11, 324/207.1, 207.21, 207.22, 207.24, 207.25; 338/32 R, 32 H; 335/205, 207, 302, 306
See application file for complete search history.

(56) References Cited

U.S. PATENT DOCUMENTS

| | | | |
|---|---|---|---|
| 3,473,109 A | 10/1969 | Didschies et al. |
| 5,313,182 A | 5/1994 | Blache |
| 5,493,216 A | 2/1996 | Asa |
| 6,211,668 B1 | 4/2001 | Duesler et al. |
| 6,215,299 B1 | 4/2001 | Reynolds et al. |
| 6,222,359 B1 | 4/2001 | Duesler et al. |
| 6,304,078 B1 | 10/2001 | Jarrard et al. |
| 6,367,337 B1 | 4/2002 | Schlabach |
| 6,411,081 B1 | 6/2002 | Spellman |
| 6,426,619 B1 | 7/2002 | Pfaffenberger et al. |
| 6,515,474 B1 | 2/2003 | Dielschneider et al. |
| 6,670,806 B2 | 12/2003 | Wendt et al. |
| 6,700,367 B1 | 3/2004 | Santos et al. |
| 2003/0112006 A1 | 6/2003 | Luetzow |
| 2005/0134257 A1 | 6/2005 | Etherington et al. |

FOREIGN PATENT DOCUMENTS

| EP | 1 008 835 A1 | 6/2000 |
|---|---|---|
| EP | 1 099 929 A1 | 5/2001 |

OTHER PUBLICATIONS

International Search Report mailed Nov. 16, 2004.

*Primary Examiner*—Edward Lefkowitz
*Assistant Examiner*—Kenneth J. Whittington
(74) *Attorney, Agent, or Firm*—DLA Piper US LLP

(57) ABSTRACT

Disclosed are a magnetic field assembly and method of configuring the same for use in position sensors of the type, which include a magnetic field sensor. First and second magnets in the field assembly are positioned on a surface of a magnetic plate (return path) and separated from one another by a separation distance. The first magnet has a magnetic axis substantially transverse to the surface of the magnetic plate, and the first magnet has a polarity opposite a polarity of the second magnet. The thicknesses of the first and second magnets are selectively varied along a stroke direction, and the separation distance is selected along with a gap length distance between the magnetic sensor and the field assembly, so that a predetermined flux density versus stroke characteristic can be provided for the position sensor.

2 Claims, 8 Drawing Sheets

POSITION SENSOR UTILIZING A LINEAR HALL-EFFECT SENSOR

RELATED APPLICATIONS

This application is a continuation of application Ser. No. 10/778,879, filed Feb. 13, 2004 now U.S. Pat. No. 7,166,996, which claims priority under 35 U.S.C. §119(e) from provisional application No. 60/447,798, filed Feb. 14, 2003.

TECHNICAL FIELD

The present invention is directed generally to position sensors, and in particular to a position sensor in which magnet thicknesses and separation are varied to provide desired flux density versus stroke characteristics.

BACKGROUND ART

Typical linear position sensors are described in an applications information publication entitled, "Linear Hall-Effect Sensors" by Allegro MicroSystems, Inc. of Worcester, Mass. Such linear position sensors are depicted in FIG. 1, for example, which is a drawing excerpted from the aforementioned publication. Each of these position sensors consists of a magnet field assembly 20 and a linear Hall-effect sensor 22. Magnetic field assembly 20 is comprised of two or four rectangular magnets 24 and soft magnetic housing 26. Linear Hall-effect sensor 22 crosses the magnetic field created by the magnets, in a left-right direction on the drawing sheet. When Hall-effect sensor 22 is located at the position D=0, the magnetic flux density is zero (0). This configuration is referred to as a "Push-Pull" approach in the aforementioned publication.

FIG. 2 illustrates a so-called "Push-Push" approach, where the Hall-effect sensor 28 moves between two magnets 30 of the same polarities. The movement is in a vertical (or up-down) direction on the drawing page. When the distance, D, corresponds to the midpoint between the two magnets 30, the magnetic flux density is zero (0). It should be mentioned that the magnets 30 in this case are also of a rectangular shape.

FIG. 3 depicts another approach: a bipolar slide-by mode. The illustration in FIG. 3 was excerpted from a publication entitled, "Hall Effect Sensing and Application, Micro Switch Sensing and Control," by Honeywell. According to that publication, in the "bipolar slide-by mode" a linear Hall-effect sensor 32 moves relative to two rectangular magnets 34 attached to a magnetic plate 36 and separated from one another by a fixed distance. FIG. 3, illustrates how the magnetic field varies as a function of the distance 38 by which the center line 40 of the magnetic field assembly 42 is separated from the center 44 of the sensor 32.

All of the position sensors discussed above have pronounced non-linearity over their stroke range.

FIG. 10 is a reproduction of FIG. 2 from U.S. Pat. No. 6,215,299. As understood, in this configuration a single magnet is used to provide north and south polarities at the opposite ends of the magnet along the direction of motion. It is believed that with such a configuration, the disclosed sensor operates only on leakage flux from the magnet, which in turn affects the overall performance of the sensor. There is therefore a need for a position sensor in which the flux density versus stroke range can be better controlled, and in which improved linearity over the stroke range can be achieved.

SUMMARY OF INVENTION

Improved control and linearity of flux density versus stroke characteristics are provided by the present invention of a magnetic field assembly, and method of configuring the magnetic field assembly, for use in a position sensor of the type which includes a magnetic field sensor. First and second magnets in the field assembly are positioned on a surface of a magnetic plate and separated from one another by a separation distance. The first magnet has a magnetic axis substantially transverse to the surface of the magnetic plate, and the first magnet has a polarity opposite a polarity of the second magnet. The thicknesses of the first and second magnets are selectively varied along the stroke direction of the position sensor, and the separation distance is selected, so that a predetermined flux density versus stroke characteristic can be provided for the position sensor.

In one embodiment of the magnetic field assembly of the present invention, the thickness of each of the first and second magnets is varied in a linear fashion so that a planar surface is provided for facing the magnetic field sensor, and which is angled at an acute angle with respect to a side transverse to the surface of the magnetic plate. The planar surfaces are further preferably angled so that the thicknesses of the first and second magnets is at a maximum at opposite ends of the magnetic field assembly, and at a minimum toward the center of the magnetic field assembly. In a particularly preferred embodiment having a linear flux density versus stroke characteristic, the acute angle is selected to be about 60 degrees.

In a further embodiment of the magnetic field assembly of the present invention, the magnetic field assembly is positionable for movement relative to the magnetic field sensor of the position sensor at a gap length distance, and further the separation distance is selected to be greater than the gap length. In a preferred embodiment, the separation distance is selected to be greater than five times the gap length.

The magnetic field assembly of the present invention is suitable for linear as well as rotary sensor applications. In a linear application context the first and second magnets may have sides which are transverse to the surface of the magnetic plate and substantially parallel to the stroke direction of the position sensor. In a rotary sensor application context, the position sensor may have an angular stroke, and the first and second magnets may have sides which are transverse to the surface of the magnetic plate and arc-shaped along the angular stroke. In the rotary sensor application context, the first and second magnets may have a width dimension which varies along the stroke direction of the position sensor.

A position sensor in accordance with the present invention includes a field assembly as described in the foregoing, and a magnetic sensor, such as a Hall-effect sensor.

It is therefore an object of the present invention to provide a method for and apparatus in which a field assembly is configured by varying the thickness of first and second magnets which are positioned apart from one another on a magnetic plate, and selecting the separation distance between the magnets, and the gap length distance, so that a desired flux density versus stroke is provided.

It is a further object of the present invention to provide a method for configuring, and a position sensor apparatus, in which first and second magnets of a field assembly are positioned on a magnetic plate at a separation distance apart, and the thickness of each magnet is varied so that each magnet provides a planar surface which faces a magnetic sensor, and which are angled at an acute angle.

These and other objectives, features and advantages will be more readily understood upon consideration of the following detailed description of certain preferred embodiments of the present invention, along with the accompanying drawings.

DETAILED DESCRIPTION OF THE INVENTION

Figure 1:
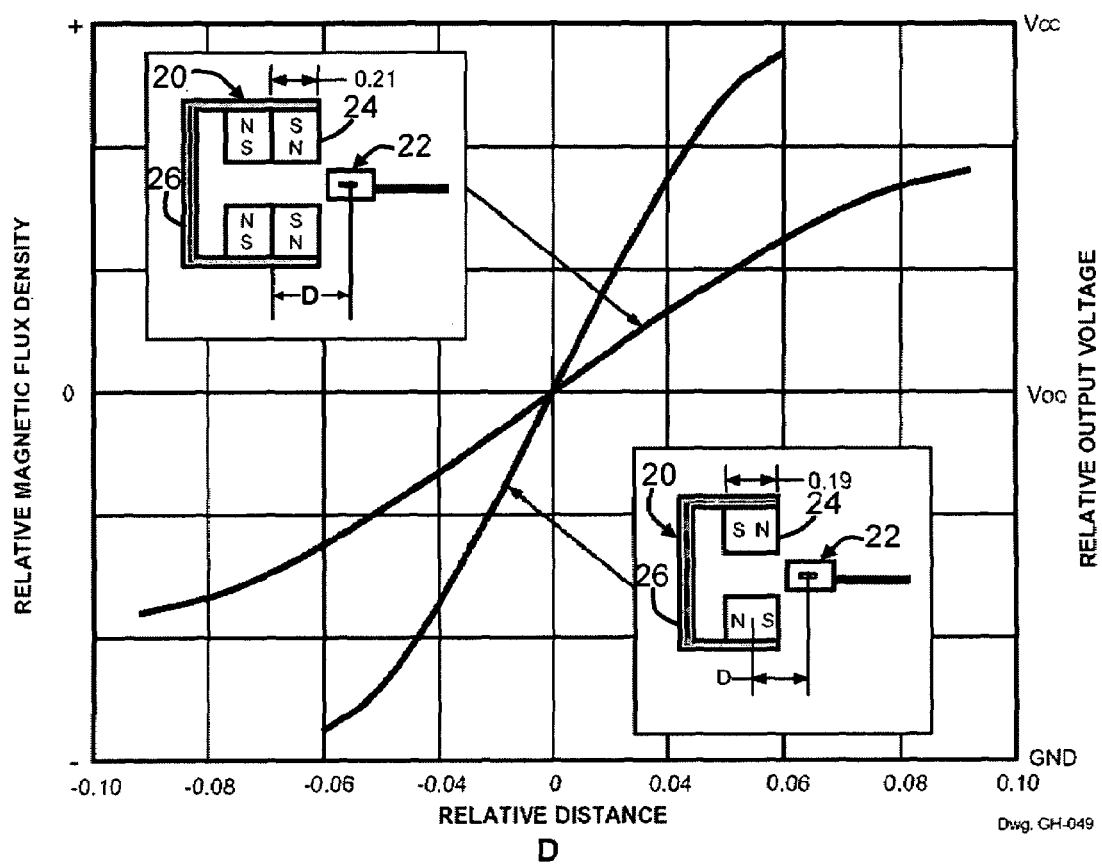
FIG. 1 is a depiction of a conventional linear position sensor.
Figure 2:
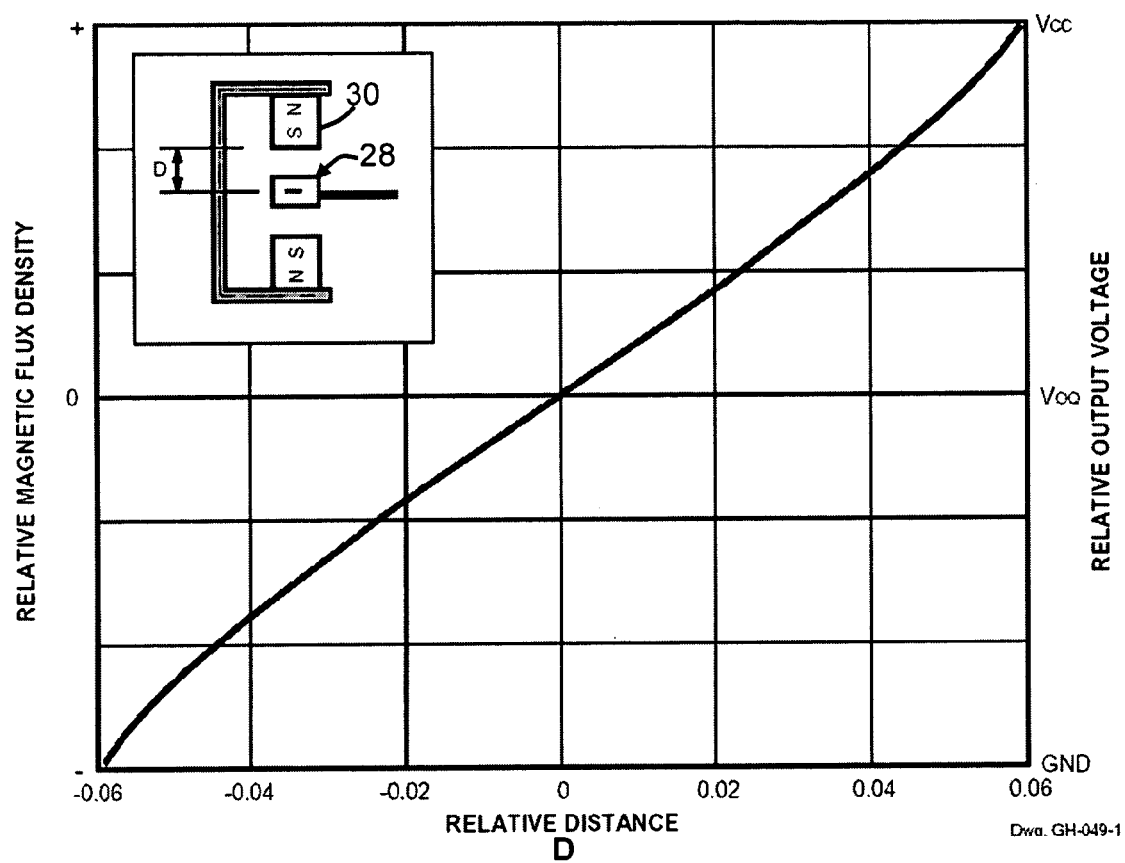
FIG. 2 illustrates a conventional so-called "Push-Push" linear position sensor approach.
Figure 3:
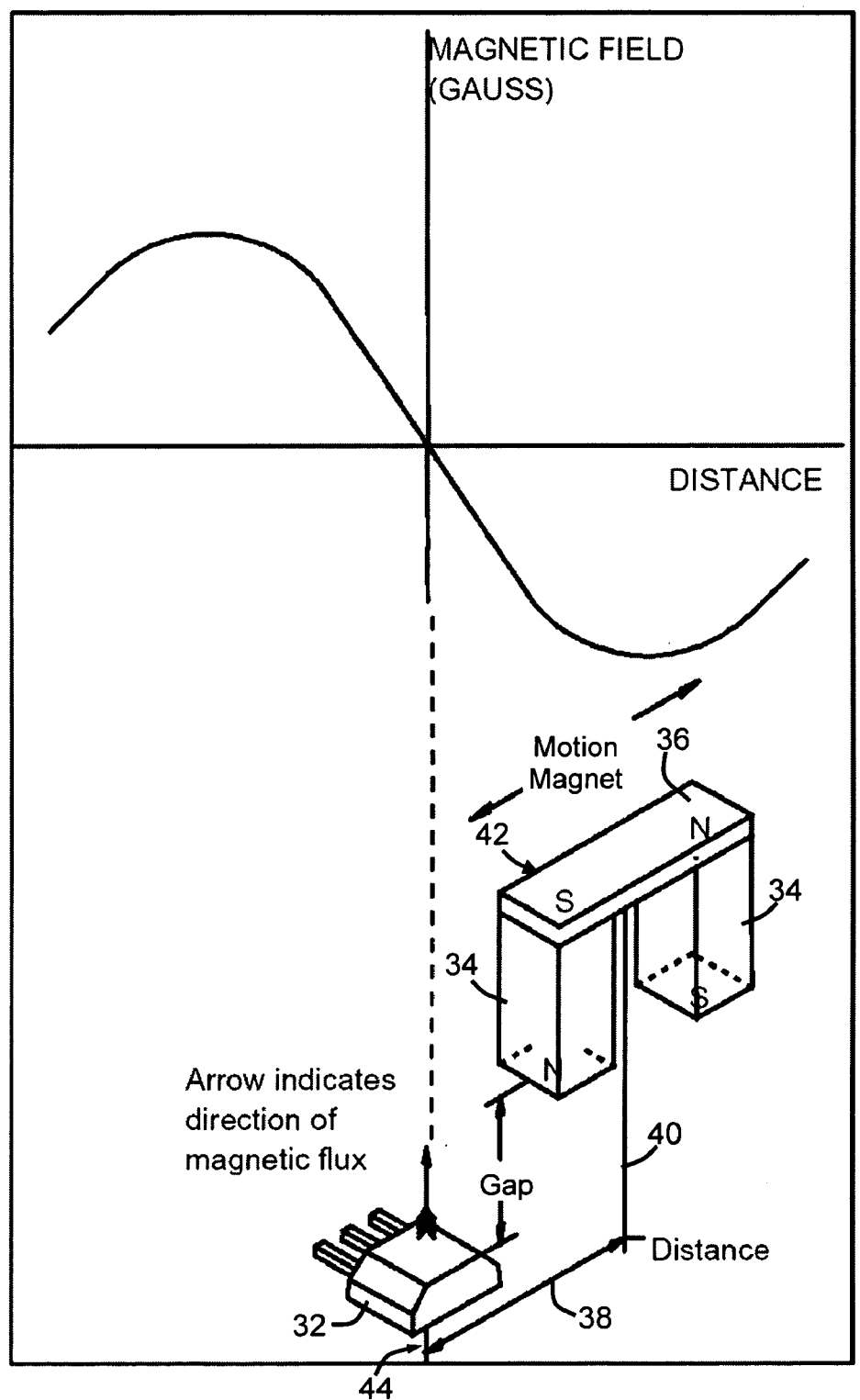
FIG. 3 illustrates another conventional linear position sensor approach referred to as a bipolar slide-by mode.
Figure 4:
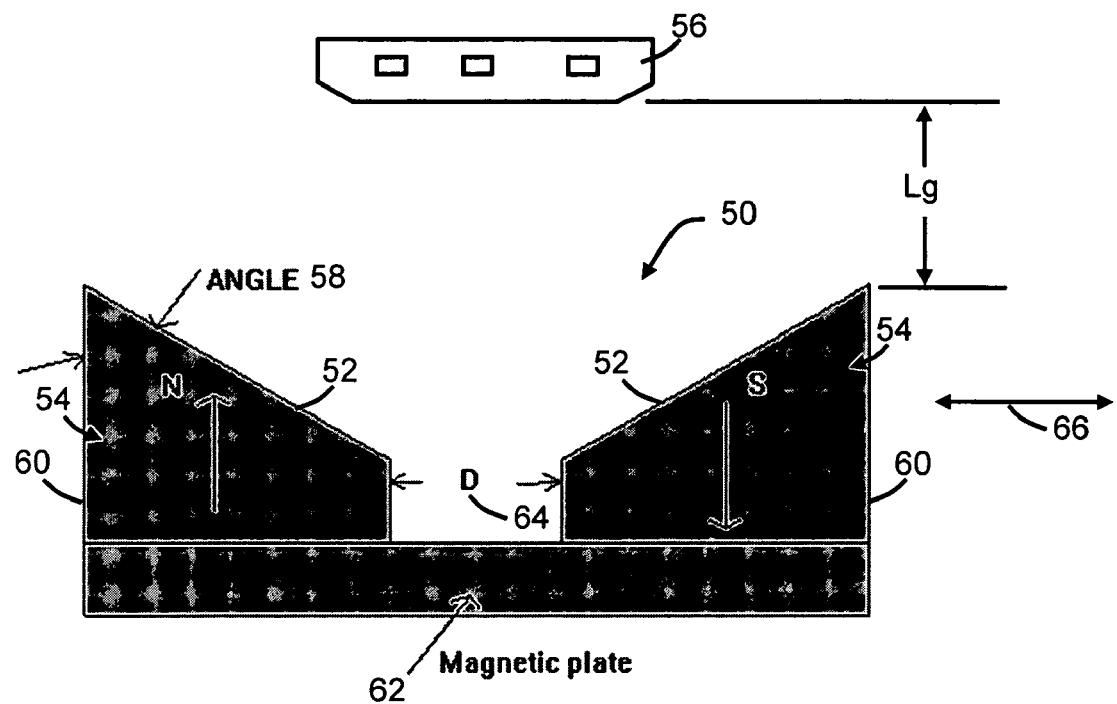
FIG. 4 illustrates a position sensor in accordance with the present invention.

Referring now to FIG. 4, a position sensor in accordance with the present invention is illustrated. In particular there is shown a cross section of a magnetic field assembly 50 of a position sensor utilizing a linear Hall-effect sensor which provides improved linearity in accordance with the present invention. As can be seen from FIG. 4, the sides 52 (of the magnets 54) which face the Hall-effect sensor 56 are formed at an angle 58 with respect to the vertical sides 60 of the magnets 54. The angle 58 is preferably and acute angle relative to the vertical sides 60. Also, the magnets 54 are positioned on magnetic plate 62 and spaced apart by a separation distance D (64). The direction of motion of the magnetic field assembly 50 is shown by arrow 66.

Figure 5:
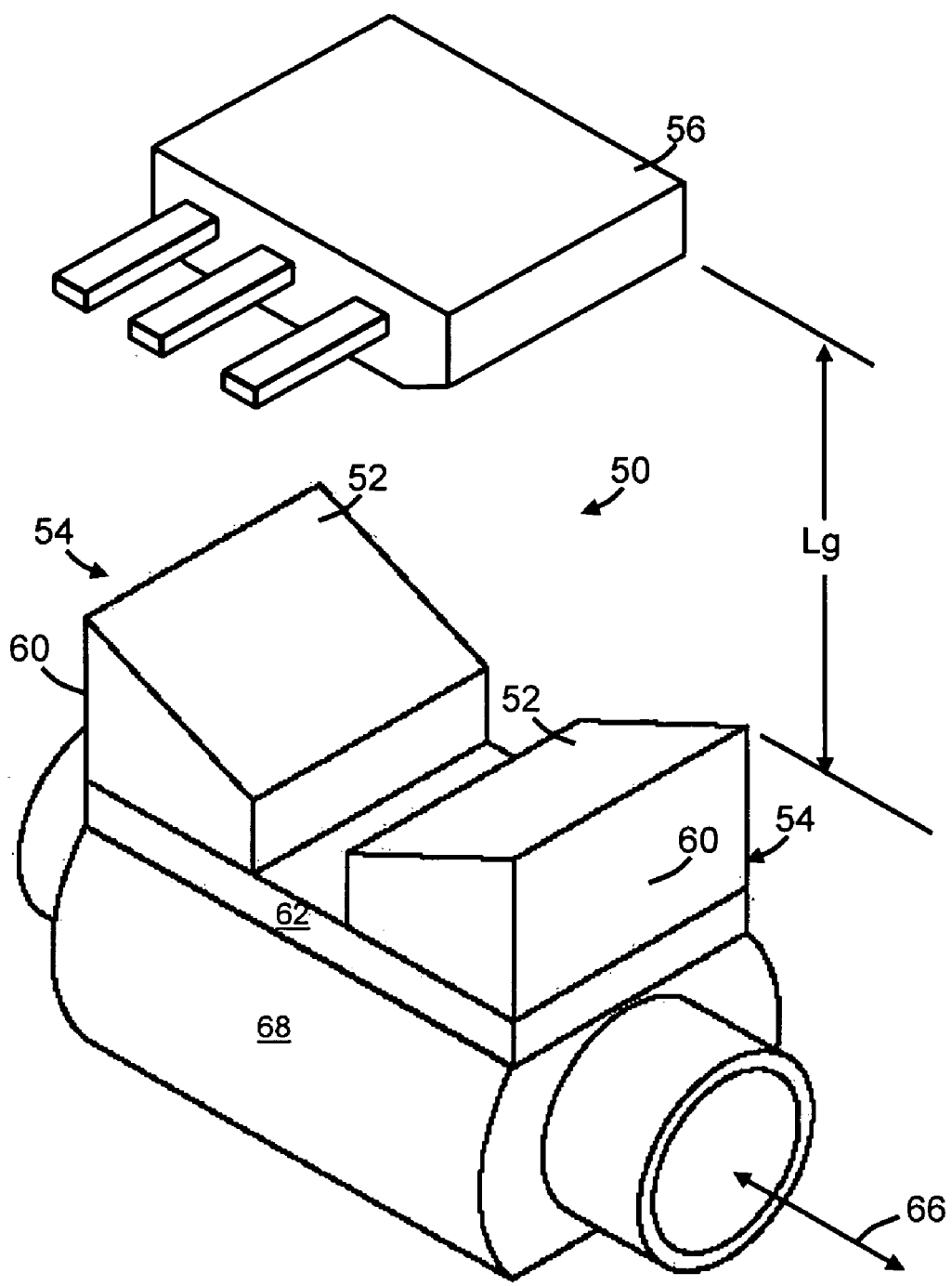
FIG. 5 illustrates one example of the use of a field assembly embodiment of the present invention in an illustrative position sensor configuration.

FIG. 5 depicts one example of the utilization of the illustrated embodiment of the position sensor of the present invention, where the magnet assembly 50 is attached to a hub 68, which, in turn, is put on a shaft of a motion device (linear motor or a linear voice coil actuator, not shown).

Figure 6:
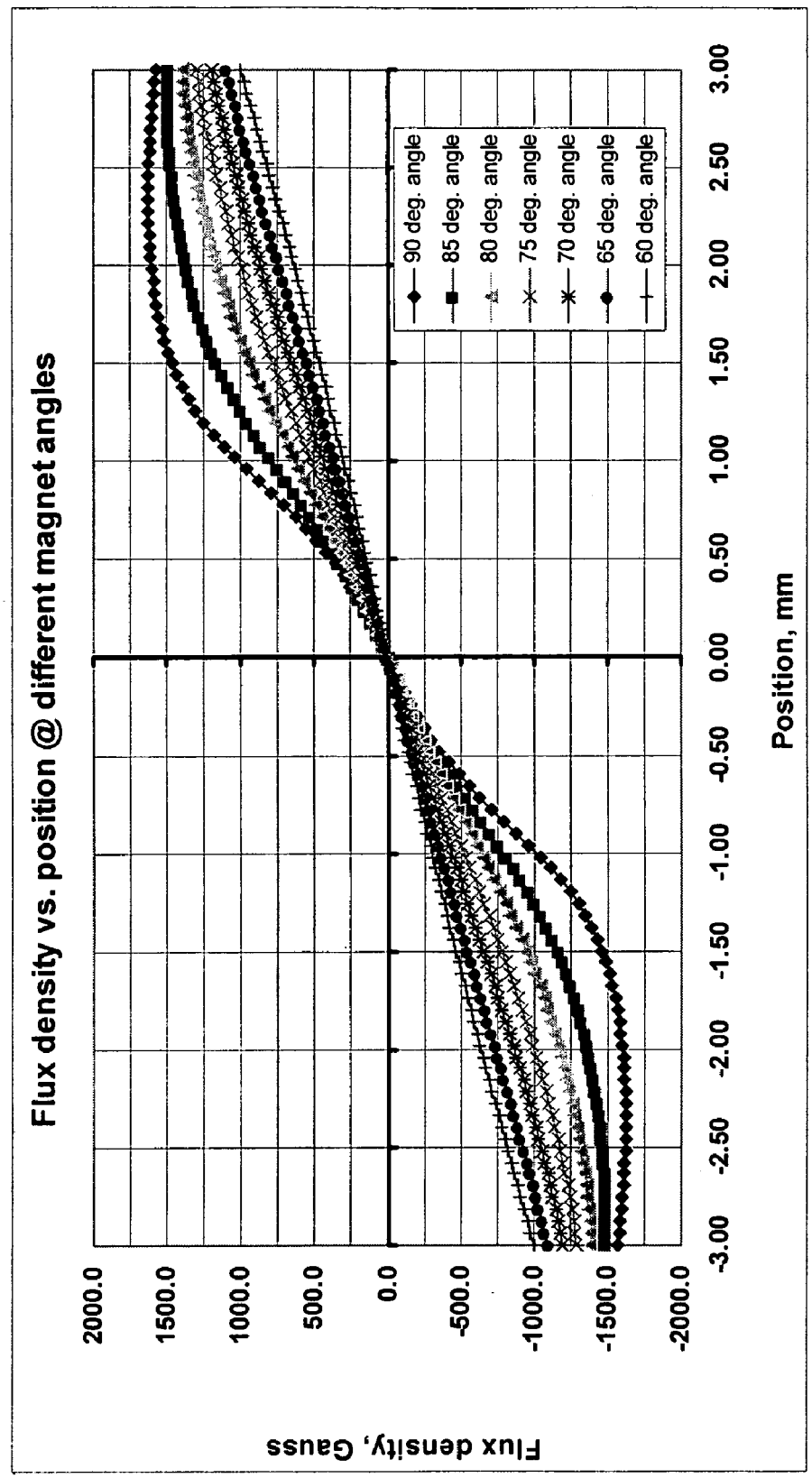
FIG. 6 shows a family of Flux Density versus Stroke curves for a position sensor embodiment in accordance with the present invention.

FIG. 6 shows a family of Flux Density versus Stroke curves at several different values of angle 58 between side 52 and side 60 of the magnets 54. As can be seen in the figure, an angle of 90 degrees has the most pronounced curvature, while an angle of approximately 60 degrees appears to produce the most linear response.

Figure 7:
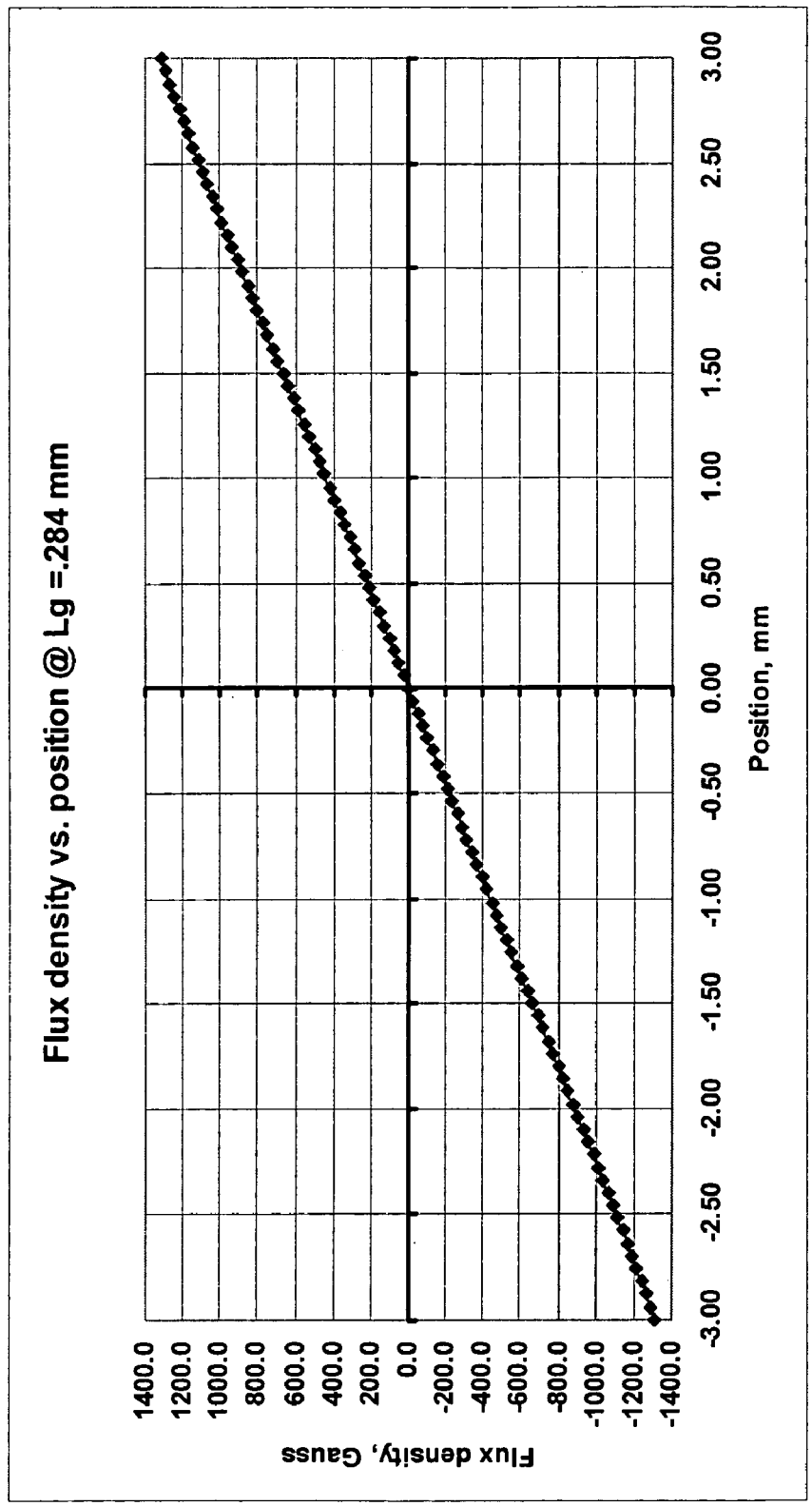
FIG. 7 depicts a Flux Density versus Stroke characteristic of an embodiment of the present invention at a magnet angle of 60 degrees and a gap length, Lg, of 0.284 mm.
Figure 10:
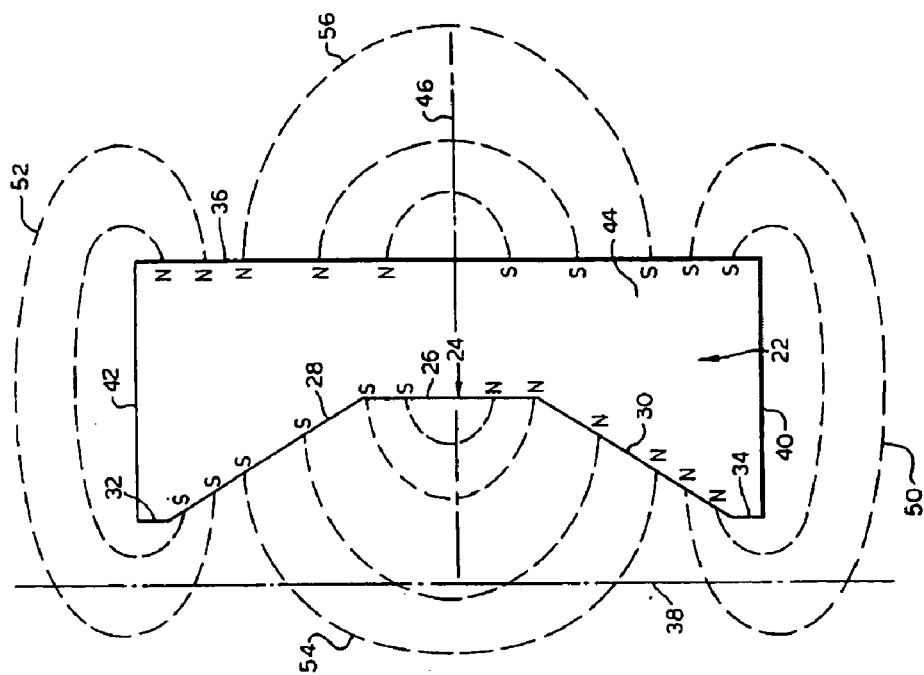
FIG. 10 is a reproduction of FIG. 2 from U.S. Pat. No. 6,215,299

FIG. 7 depicts such a Flux Density versus Stroke characteristic at a magnet angle of 60 degrees and a gap length, Lg, of 0.284 mm between the Hall-effect sensor 56 and the upper corners of the magnets 54. For this embodiment of the present invention, the separation distance D (64), by which the magnets 54 were spaced apart from one another, was approximately 1.8 mm. Thus, for this particular configuration, the separation distance is selected to be greater than the gap length distance, and, in this example, more than five times greater. The selected geometry allowed to achieve the linear output of the position sensor in a stroke range of 4.5 mm within 3%. From the above description and drawings it can be appreciated that according to the present invention, a new configuration of the magnetic field assembly of a position sensor has been discovered which improves linearity of the sensor characteristic, and which can also be used to shape the sensor characteristics as desired. In general, the thickness of the magnets in the magnetic field assembly is varied to affect the shape of the flux density versus stroke characteristic of the position sensor. This variation in thickness is made along the direction of the stroke of the position sensor. In the preferred embodiment of the present invention, the thickness is varied in a linear fashion so that on each magnet there is provided a planar surface which faces the Hall-effect sensor, and which is angled with respect to a vertical side of the magnet. In the preferred embodiment, this angling of the surfaces is selected so that the thickness of the magnets is a maximum at the ends of the magnetic field assembly, and at a minimum toward the center of the magnetic field assembly.

In the preferred embodiment of the present invention it has been found that by varying three parameters—magnet angle, distance between the magnets, and the distance between the magnets and a linear Hall-effect sensor—linearity can be substantially improved.

The configurations of the present invention, as set forth above, provide a number of benefits over previous sensor configurations. In the present invention, a magnet assembly includes separate magnets with selected, varied thicknesses, and which are attached to a soft magnetic plate or body. The soft magnetic plate operates as a return path which influences the magnetic flux distribution produced by the separate magnets and the magnetic assembly. The resulting magnetic circuit allows the magnetic flux to be concentrated to provide an increased normal component of the magnetic flux, which is available to be sensed by the Hall sensor. Thus, compared to the single magnet case in prior sensor configurations, the present invention provides an increased normal component and a reduced tangential component of magnetic flux from the magnet assembly. In turn, the size of the magnet assembly, for example the height, can be minimized as compared to prior sensor configurations. It follows that the total height of the position sensor itself can be reduced proportionately.

Further, the use of separate magnets permits each magnet to be magnetized independently of the other, so that its magnetic characteristics can be better tailored to produce the desired effect on the magnetic flux distribution produced by the thickness variations selected for the magnet. For example, higher energy product material can be used for the magnets in the present invention than could be used in a single magnet configuration. In turn, as compared to prior sensors, this permits a further reduction in the height of a position sensor.

It is also to be understood, in accordance with the present invention, that while the described embodiment of the present invention uses a symmetrical configuration of the magnets 54 in magnetic field assembly 50, other configurations can be employed depending upon the flux density versus stroke characteristic of the position sensor that is being sought. Thus, in accordance with the present invention, by varying the shape of each magnet and relative spacing between the magnets in the magnetic field assembly, and the gap length between magnets and the Hall-effect sensor, a variety of flux density versus stroke characteristics for the position sensor can be obtained.

Further, it is to be understood that each magnet described herein need not be made from one piece, and can be provided by a combination of discrete magnets of certain shape. Material of the magnets can be molded or sintered Neodymium Iron Boron, or Samarium Cobalt, or other suitable material.

Figure 8:
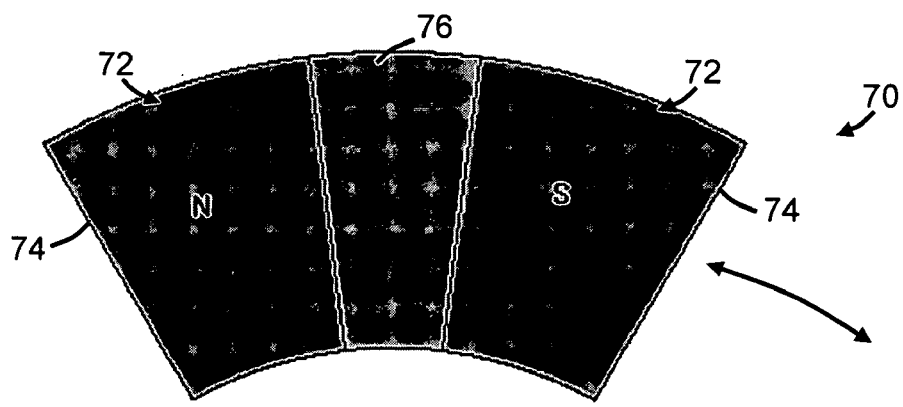
FIG. 8 illustrates a top view of the magnetic field assembly of a rotary embodiment of the present invention.

Further, although the embodiment described above is a linear position sensor application of the present invention, the concepts of the present invention can be used in rotary position sensors as well. FIG. 8 is an illustration of a top view of the magnetic field assembly 70 of a rotary embodiment of the present invention. As with the linear embodiment described above, the magnets 72 of the rotary embodiment have maximum thickness at the ends 74 of the magnetic field assembly, with the thickness tapering to a minimum toward the center of the magnetic field assembly. In this manner, angled surfaces are provided which face the Hall-effect sensor. Also, because of the curvature of magnets 72 and magnetic plate 76 of this rotary embodiment, the distance separating the magnets 74 from each other may vary radially. The sides of the magnets 72 which are transverse to the surface of the magnetic plate can be described as arc-shaped along the rotary stroke direction.

While the position sensor of the present invention has been described as using a linear Hall-effect sensor, those skilled in the art will understand that other types of magnetic sensors can be employed within the spirit of the invention.

Figure 9:
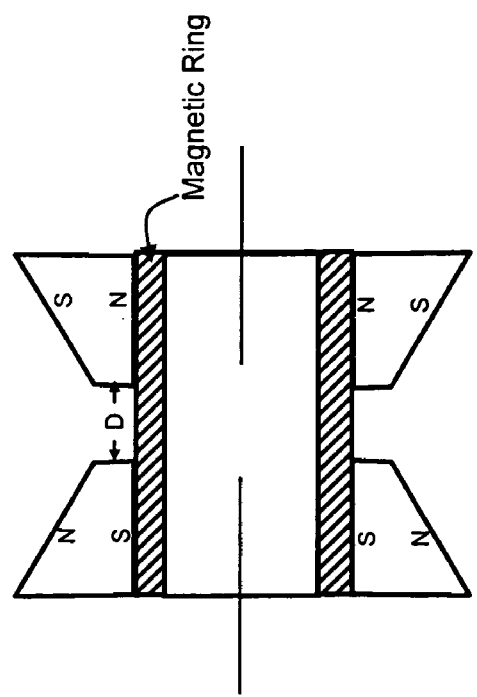
FIG. 9 illustrates a cylindrical sensor geometry in accordance with the present invention.

For example, referring to FIG. 9, a further embodiment of the present invention now will be described. This embodiment in shown in cross section and has the form of a magnetic ring with two radially magnetized ring magnets spaced apart by distance D. In the configuration shown, the magnetic ring has an inside dimension that will permit it to slide over and be coupled to an existing shaft for which position information is to be sensed. Alternatively, the magnetic path can be done in a shape of a solid cylinder and provided with an appropriate feature to connect the magnet assembly to the shaft, position of which is to be monitored. The thickness, separation, and other dimensional features of the radially magnetized ring magnets are preferably selected according to the criteria set forth above for the other embodiments of the present invention.

The ring magnets and the magnetic ring (return path) share a common axis. In use, the direction of motion of this magnetic assembly typically is parallel to this common axis, and the magnetic sensor is positioned in a plane parallel to the common axis, and at a radial distance apart from the common axis and magnetic assembly. An important benefit of the configuration of FIG. 9 is that it is highly insensitive to any angular shaft misalignment about the shaft axis. Thus, even if the shaft is rotated by a certain angle around its axis because of lack of anti-rotational device, or other reason, the magnetic sensor would continue to be properly aligned relative to the magnet assembly. In practical applications, such as in a linear voice coil actuator, there is inevitably some angular movement of the shaft. Thus, the configuration of FIG. 9 is particularly useful in that context. The terms and expressions which have been employed herein are intended as terms of description and not of limitation, and there is no intent in the use of such terms and expressions of excluding equivalents of the features shown and described, or portions thereof, it being recognized that various modifications are possible within the scope of the invention claimed.

What is claimed is:

1. A magnetic field assembly for use in a position sensor device of the type which includes a magnetic field sensor and having a stroke direction, the field assembly comprising
   first and second magnets positioned on a surface of and concentric with a component providing a magnetic return path having a cylindrical cross section and separated from one another by a separation distance, wherein the first magnet has a magnetic axis substantially transverse to the surface of the component providing the magnetic return path, and the first magnet has a polarity orientation opposite a polarity orientation of the second magnet; and
   further wherein cross sectional thicknesses of each of the first and second magnets are selectively varied along the stroke direction, and the separation distance is selected, so that a predetermined flux density versus stroke characteristic can be provided for the position sensor.

2. The magnetic field assembly of claim 1, wherein the magnetic field sensor is a Hall-effect sensor.

* * * * *

UNITED STATES PATENT AND TRADEMARK OFFICE
CERTIFICATE OF CORRECTION

PATENT NO. : 7,250,754 B2  
APPLICATION NO. : 11/656173  
DATED : July 31, 2007  
INVENTOR(S) : Mikhail Godkin Page 1 of 1

It is certified that error appears in the above-identified patent and that said Letters Patent is hereby corrected as shown below:

Title page, item (73) Change: "Bei Sensors and Systems Company, Inc." to --BEI Sensors and Systems Company, Inc.--

Title page, item (73) Change: "Sylmer" to --Sylmar--.

Signed and Sealed this

Second Day of October, 2007

JON W. DUDAS  
*Director of the United States Patent and Trademark Office*